United States Patent [19]

Redelman

[11] Patent Number: 5,706,918
[45] Date of Patent: Jan. 13, 1998

[54] BRAKE APPLY MECHANISM

[75] Inventor: James Allan Redelman, Indianapolis, Ind.

[73] Assignee: General Motors Corporation, Detroit, Mich.

[21] Appl. No.: 578,417

[22] Filed: Dec. 26, 1995

[51] Int. Cl.$^6$ ............................................. F16D 65/14
[52] U.S. Cl. ............................. 188/106 F; 188/72.6
[58] Field of Search ......................... 188/106 F, 72.6; 74/424.8 C; 475/330

[56] References Cited

U.S. PATENT DOCUMENTS

| | | | |
|---|---|---|---|
| 3,877,320 | 4/1975 | Iijima | 74/759 |
| 4,793,447 | 12/1988 | Taig | 188/72.1 |
| 4,804,073 | 2/1989 | Taig | 188/72.1 |
| 4,989,703 | 2/1991 | Forsyth | 188/151 |
| 5,390,986 | 2/1995 | Hall, III | 303/3 |

Primary Examiner—Karen B. Merritt
Assistant Examiner—C. T. Bartz
Attorney, Agent, or Firm—Jeffrey A. Sedlar; Ernest E. Helms

[57] ABSTRACT

A brake apply mechanism for a power transmission is provided which includes a planetary gear set having a ring gear member, a carrier assembly member and a sun gear member; an operator-controlled brake apply mechanism operatively connected to the sun gear member to selectively enforce rotation thereof; an auxiliary spring applied hydraulically released brake apply mechanism selectively operable to enforce rotation of the ring gear member to initiate brake engagement; and a brake apply mechanism operatively connected to the carrier assembly member to enforce brake engagement when either the operator control brake apply mechanism or the auxiliary brake apply mechanism is operated.

12 Claims, 1 Drawing Sheet

BRAKE APPLY MECHANISM

FIELD OF THE INVENTION

The field of the present invention relates generally to vehicular braking systems for heavy track vehicles. More particularly, the present invention is useful for vehicular braking systems that incorporate self-energization such as brakes described in Hall III, U.S. Pat. No. 5,390,986, commonly assigned.

BACKGROUND OF THE INVENTION

Many track vehicle braking systems are hydraulically actuated to achieve normal performance levels. However, additional requirements are placed on braking systems to meet performance requirements without hydraulic pressure for static hold on a 60% grade or stopping a vehicle following a hydraulic system failure by allowing manual actuation. Human factor considerations limit the maximum force and travel input available to a manual actuation brake system to that which can be provided by a fifth percentile individual.

Typically, heavy track vehicles (30 tons and up) require a mechanical assist mechanism in the vehicle brake linkage to achieve adequate performance. Typically, such a mechanical assist mechanism includes some type of self-energization. Due to self-energization, brake system "feel" is often less than optimally desired, due to the nonlinear shape of the brake torque vs. brake pedal effort.

SUMMARY OF THE INVENTION

The present invention has a planetary gear set juxtaposed between a manually-operated brake pedal and a brake apply linkage. The planetary gear set provides a dual input to the transmission brake apply linkage which is driven by the planetary carrier. One input drives the ring gear and one input drives the sun gear. The dual input arrangement provides flexibility to the brake system.

DESCRIPTION OF THE PREFERRED EMBODIMENT

Figure 1:
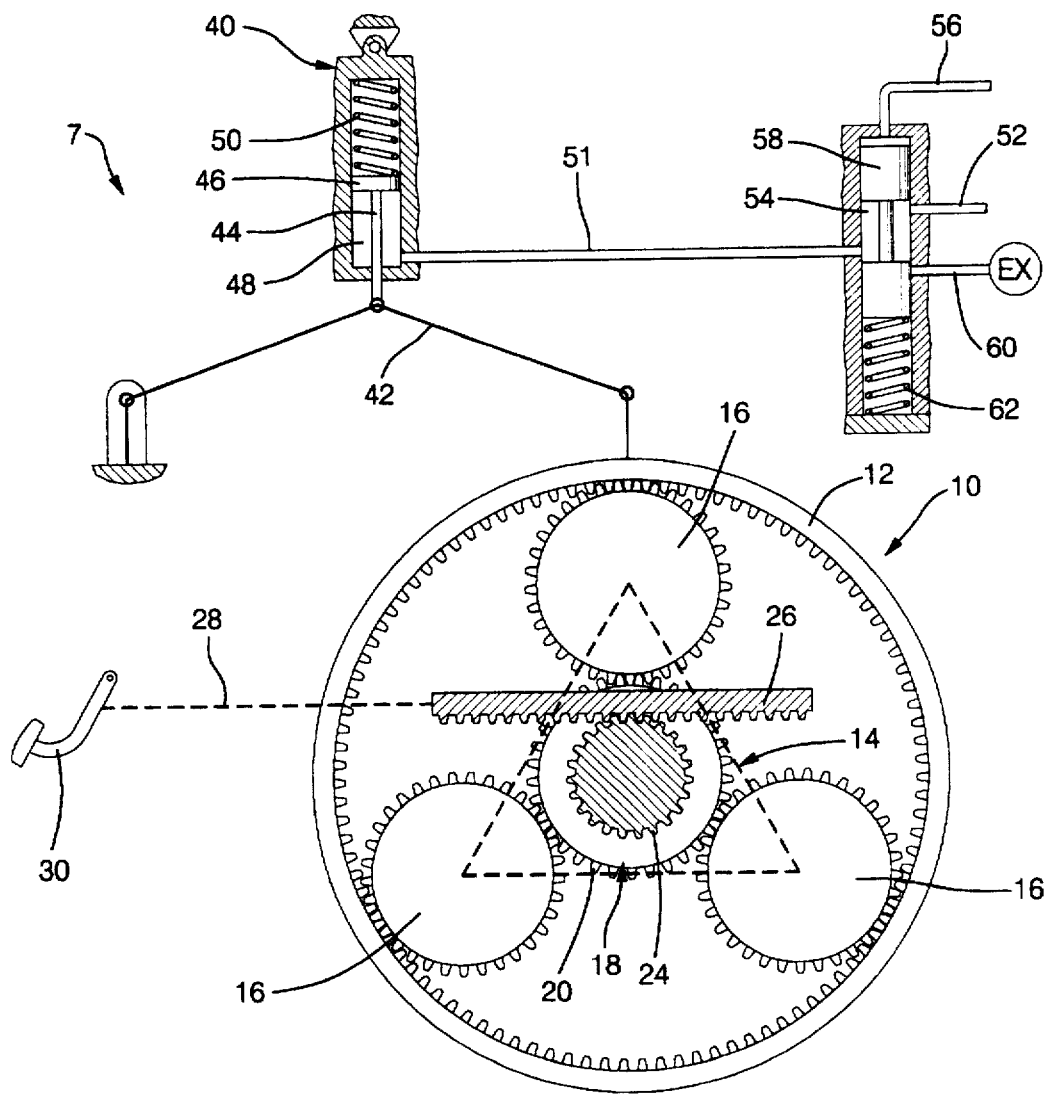
FIG. 1 is a schematic view of a preferred embodiment brake apply mechanism according to the present invention.
Figure 2:
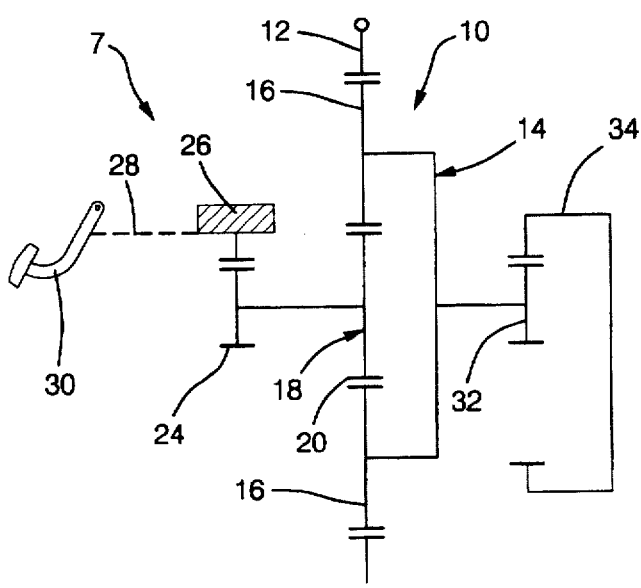
FIG. 2 is a schematic view illustrating the operational aspect of the brake apply system shown in FIG. 1.

Referring to FIGS. 1 and 2, the brake apply system 7 according to the present invention has a planetary gear set 10. Planetary gear set 10 has a ring gear 12. Placed within the ring gear 12 and meshed therein is a carrier assembly 14 which has operatively connected thereto three planet gears 16. The planet gears 16 rotate around a sun gear 18. The sun gear 18 has an outer set of gear teeth 20 which are meshed with the planet gears and a second set of gear teeth 24 which are meshed with a rack gear 26. The rack gear 26 is manipulated by a linkage 28 which is manipulated by an operator-controlled brake pedal 30.

The carrier assembly 14 connects with an output gear 32 which is enmeshed with a ring gear 34 of a self-energizing brake apply mechanism such as that shown in described in aforementioned Hall III as best shown in FIG. 8A of the Hall patent.

An auxiliary brake apply system 40 has a linkage 42 connected with the ring gear 12. Linkage 42 may be acted upon by a piston rod 44 to rotate, as best shown in FIG. 1, in a clockwise direction. To prevent the actuation of the braking system 7 in the normal mode of operation, a piston 46 connected to piston rod 44 is acted upon by hydraulic pressure within a chamber 48 to push against a spring 50. Hydraulic pressure is maintained in the chamber 48 by virtue of pressurized fluid entry through a hydraulic pressure line 52 into a cylinder 54. A brake signal line 56 is utilized for hydraulically assisted braking.

In normal operation, a hydraulic brake signal is applied through signal line 56. The hydraulic signal through line 56 causes a hydraulic piston 58 to be pushed downwardly, cutting off the hydraulic pressure line 52 and allowing chamber 48 to be relieved through an exhaust line 60 via a line 51. The above actions will allow the spring 50 to force down the piston rod 44, causing the linkage 42 to force the ring gear 12 in a clockwise orientation, rotating the carrier 14 in a clockwise rotation, and thereby causing the self-energizing ring gear 34 to be rotated to an engaging position. Deactivation of the pressure in the signal line 56 will allow a spring 62 to return the piston 58 to its upright position, closing off the exhaust line 60 and again exposing the piston 46 to pressure from the (normal) hydraulic pressure line 52, causing the piston rod 44 to be retracted and the linkage 42 to manipulate the ring gear 12 counterclockwise to relieve the brakes. It should be noted that brake signal line 56 may be utilized not only for normal braking, but may also be connected to an antilock braking system of the vehicle.

In cases of hydraulic system failure, the spring 62 will hold up the piston 58 to close off the exhaust line 60. Since hydraulic system pressure has failed, the spring 50 may now push down the piston 46, causing the linkage 42 to rotate the ring gear 12 clockwise to take up any slack in the transmission brake apply system (self-energizing ring gear 34). Thereafter, when the operator utilizes his or her foot to operate the pedal 30, causing the rack gear 26 to move rightwardly (FIG. 1), the carrier 14 will move in a clockwise direction and thereby apply the transmission brake apply system 34. The mechanical advantage will be equal to $(R+S)/S$, where R equals the number of rear gear teeth and S equals the number of sun gear teeth. The mechanical advantage will be approximately 3 to 6 and will therefore be adequate to eliminate the normal hydraulic brake apply assist normally required.

In an embodiment of the present invention not shown, the auxiliary brake apply system 40 will be replaced by an electric actuator, which may provide independent braking in a brake by wire system.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A brake apply mechanism comprising:

a brake pedal;

a vehicle transmission including a planetary gear set with a ring gear and a carrier assembly operatively connecting a plurality of planet gears within the ring gear wherein the planet gears rotate around a sun gear and mesh with a first set of gear teeth of the sun gear with a substantially straight rack gear engaging the sun gear at a second set of gear teeth;

a linkage connecting the brake pedal to the rack gear wherein operation of the brake pedal transmits movement through the linkage to the rack gear causing the rack gear to move rotating the sun gear and causing the carrier to move to apply the brake apply mechanism within the vehicle transmission;

an auxiliary brake apply mechanism including an auxiliary linkage connected with the ring gear and a piston rod wherein the piston rod is connected to a piston that is carried with a spring on a first side of the piston and a hydraulic pressure chamber on a second side of the piston wherein when a hydraulic pressure release is enabled from the hydraulic pressure chamber, the spring moves the piston into the hydraulic pressure chamber, moving the auxiliary linkage through the piston rod with the auxiliary linkage causing the ring gear to rotate the carrier in a brake apply direction; and, a line connecting the hydraulic pressure chamber to a cylinder wherein the cylinder carries a spool piston alternately registering with a hydraulic pressure line and an exhaust line so that when the spool piston registers with the hydraulic pressure line, hydraulic pressure is conveyed through the line to the hydraulic pressure chamber causing the piston to compress the spring releasing the auxiliary brake apply mechanism and when the spool piston registers with the exhaust line, hydraulic pressure is released from the hydraulic pressure chamber allowing the spring to move the piston to apply the auxiliary brake apply mechanism;

wherein the planetary gear set provides a mechanical advantage to the brake pedal in applying the brake apply mechanism of approximately 3:1 to 6:1 so that the brake apply mechanism is applied without hydraulic brake apply assist.

2. A brake apply mechanism for a power transmission comprising:

a planetary gear set having a ring gear member, a carrier assembly member and a sun gear member;

an operator-controlled brake apply mechanism operatively connected to one of the members of the planetary gear set to selectively enforce rotation there of through a rack gear that engages the sun gear wherein the rack gear is manipulated by a linkage that engages the rack gear wherein the linkage is manipulated by an operator-controlled brake pedal that engages the linkage;

an auxiliary brake apply mechanism selectively operable to enforce rotation of another of the members of the planetary gear set to initiate brake engagement; and a brake apply mechanism operatively connected to yet another of the members of the planetary gear set to enforce brake engagement when either the operator control brake apply mechanism or the auxiliary brake apply mechanism is operated.

3. A brake apply mechanism as described in claim 2 wherein the brake apply mechanism is operatively connected to the carrier assembly.

4. A brake apply mechanism as described in claim 2 wherein the auxiliary brake apply mechanism is selectively operable to enforce rotation of the ring gear.

5. A brake apply mechanism as described in claim 2 wherein the auxiliary brake apply mechanism is spring actuated with a hydraulic release.

6. A brake apply mechanism for a power transmission comprising:

a planetary gear set having a ring gear member, a carrier assembly member and a sun gear member;

an operator-controlled brake apply mechanism operatively connected to the sun gear member to selectively enforce rotation thereof;

an auxiliary spring applied hydraulically released brake apply mechanism selectively operable to enforce rotation of the ring gear member to initiate brake engagement; and a brake apply mechanism operatively connected to the carrier assembly member to enforce brake engagement when either the operator control brake apply mechanism or the auxiliary brake apply mechanism is operated.

7. A brake apply mechanism as described in claim 6 wherein the auxiliary spring applied hydraulically released brake apply mechanism includes a linkage that is connected with the ring gear member, and a piston connected to the linkage through a piston rod.

8. A brake apply mechanism as described in claim 7 further comprising a valve, wherein the valve is normally open to supply a fluid pressure to the auxiliary spring applied hydraulically released brake apply mechanism to prevent actuation of the brake apply mechanism and wherein, when the valve is supplied with a hydraulic signal through a line connected to the valve, a valve piston in the valve is shifted cutting off the fluid pressure to the auxiliary spring applied hydraulically released brake apply mechanism wherein the ring gear is rotated by action of a spring in the auxiliary spring applied hydraulically released brake apply mechanism.

9. A brake apply mechanism comprising:

a brake pedal;

a vehicle transmission including a planetary gear set with a ring gear and a carrier assembly operatively connecting a plurality of planet gears within the ring gear wherein the planet gears rotate around a sun gear and mesh with a first set of gear teeth of the sun gear with a substantially straight rack gear engaging the sun gear at a second set of gear teeth; and, a linkage connecting the brake pedal to the rack gear wherein operation of the brake pedal transmits movement through the linkage to the rack gear causing the rack gear to move rotating the sun gear and causing the carrier to move to apply the brake apply mechanism within the vehicle transmission.

10. A brake apply mechanism according to claim 9 wherein the planetary gear set provides a mechanical advantage to the brake pedal in applying the brake apply mechanism of approximately 3:1 to 6:1 so that the brake apply mechanism is applied without hydraulic brake apply assist.

11. A brake apply mechanism according to claim 9 further comprising:

an auxiliary brake apply mechanism including an auxiliary linkage connected with the ring gear and a piston rod wherein the piston rod is connected to a piston that is carried with a spring on a first side of the piston and a hydraulic pressure chamber on a second side of the piston wherein when a hydraulic pressure release is enabled from the hydraulic pressure chamber, the spring moves the piston into the hydraulic pressure chamber, moving the auxiliary linkage through the piston rod with the auxiliary linkage causing the ring gear to rotate the carrier in a brake apply direction.

12. A brake apply mechanism according to claim 11 further comprising:

a line connecting the hydraulic pressure chamber to a cylinder wherein the cylinder carries a spool piston alternately registering with a hydraulic pressure line and an exhaust line so that when the spool piston registers with the hydraulic pressure line, hydraulic pressure is conveyed through the line to the hydraulic pressure chamber causing the piston to compress the spring releasing the auxiliary brake apply mechanism and when the spool piston registers with the exhaust line, hydraulic pressure is released from the hydraulic pressure chamber allowing the spring to move the piston to apply the auxiliary brake apply mechanism.

* * * * *